Aug. 7, 1934.   R. S. KLOPFENSTEIN   1,969,614
OVEN
Filed Aug. 28, 1933
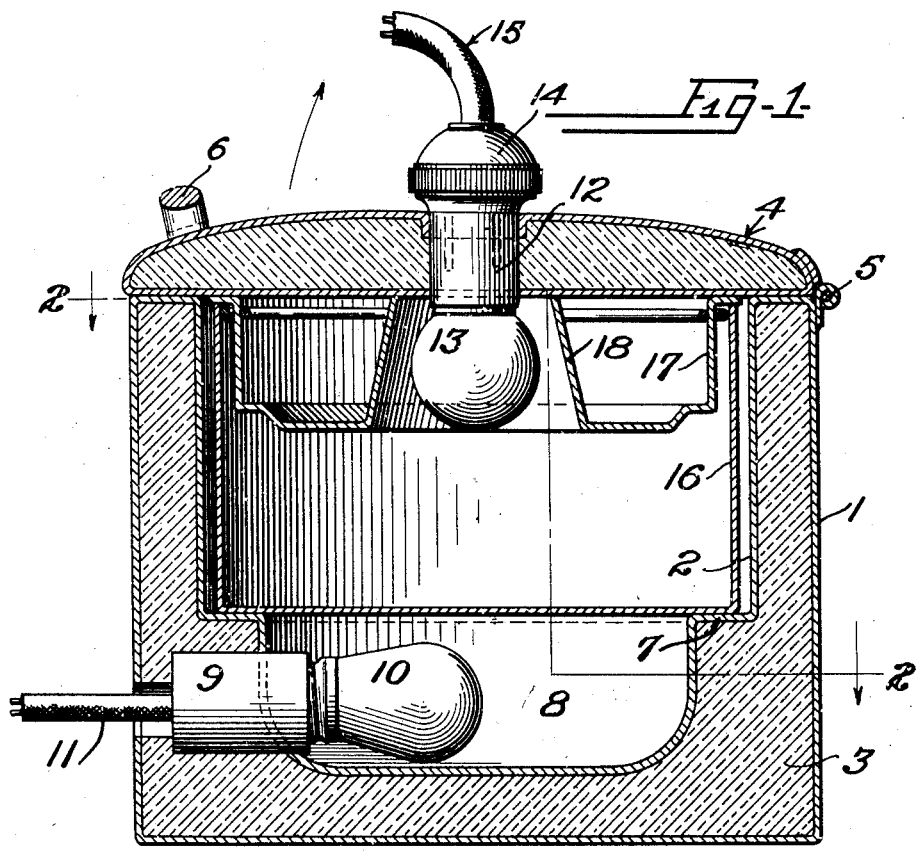
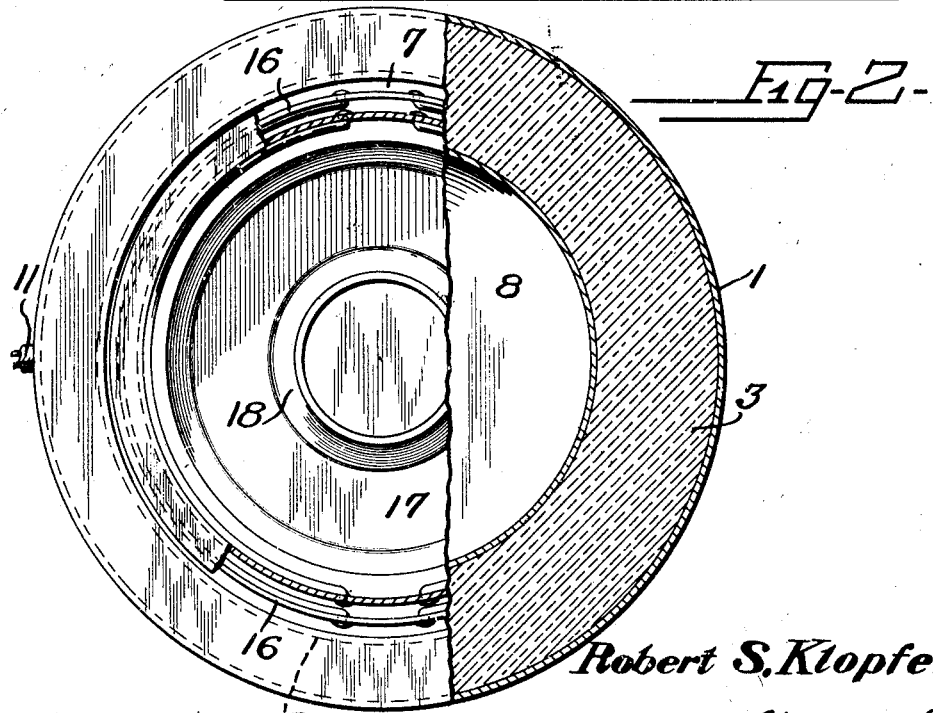
Robert S. Klopfenstein,
INVENTOR Patented Aug. 7, 1934

1,969,614

UNITED STATES PATENT OFFICE 1,969,614

OVEN

Robert S. Klopfenstein, Wichita, Kans.

Application August 28, 1933, Serial No. 687,210

1 Claim. (Cl. 219—35)

This invention relates to ovens or cookers, and has for the primary object the provision of a device so constructed that the loss or waste of heat is reduced to a minimum and permits the usual electric lamp as a heating medium, providing proper heat to foods for the thorough cooking thereof without danger of overcooking or burning.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a cooker constructed in accordance with my invention.

Figure 2 is a sectional view taken on the line 2—2 of Figure 1.

Referring in detail to the drawing, the numeral 1 indicates an outer shell integrally connected with an inner shell 2 providing a space between said shells for a suitable insulation 3. A cover 4 constructed similarly to the body portion of the device is hinged to the latter, as shown at 5, and is provided with a handle 6 whereby the cover may be readily moved into open or closed position.

The inner shell 2 is offset to form a shoulder 7 and a heat chamber 8. An electric lamp socket 9 extends into the heat chamber 8 and carries an electric lamp 10 and the conductors 11 thereof extend exteriorly of the device. The cover 4 carries an electric lamp socket 12 which supports an electric lamp 13 preferably of a lower wattage than the electric lamp 10. The socket 12 is designed to receive a plug connection 14 having conductors 15. The conductors 11 and 15 lead to a conventional electrical output.

A receptacle 16 is positioned in the inner shell and rests upon the shoulder 7 and overlies the electric lamp 10. The upper edge of the receptacle 16 supports a tray 17 which depends downwardly in the receptacle 16 and is provided centrally thereof with a conical-shaped portion 18 arranged about the electric lamp 13.

The cover 4 when in a closed position abuts the conical portion 8 and the flange of the tray which rests upon the receptacle 16 thereby effectively sealing the interior of the receptacle 16 and tray to the atmosphere. The electric lamps when illuminated will furnish sufficient heat to thoroughly cook foods within the receptacle 16 and tray 17 without the danger of overcooking or burning of the food. When desiring to cook the food slowly at a low heat, the plug 14 may be disconnected from the socket 12, rendering the lamp 13 inoperative. To employ the device as a warmer the electric lamp 13 is employed or illuminated and the electric lamp 10 is extinguished.

The tray and receptacle are provided with handles or bails to facilitate lifting of these parts from the cooker when desired.

While I have shown and described the preferred embodiment of my invention, it will be understood that minor changes in construction, combination and arrangement of parts may be made without departing from the spirit and scope of my invention, as claimed.

Having described the invention, I claim:

A cooker comprising an insulated body having a chamber, a seat in said chamber, an electric lamp in said chamber below the seat, a food utensil supported by the seat above the electric lamp, an insulated cover for closing the chamber, an electric lamp carried by the cover and extending into the food utensil, and a tray supported by the utensil and depending downwardly therein and provided with a conical-shaped portion surrounding the second-named lamp.

ROBERT S. KLOPFENSTEIN.